United States Patent
VanBlon et al.

(10) Patent No.: US 11,552,851 B2
(45) Date of Patent: Jan. 10, 2023

(54) CONFIGURATION OF DEVICE THROUGH MICROPHONE PORT

(71) Applicant: Lenovo (Singapore) Pte. Ltd., Singapore (SG)

(72) Inventors: Russell Speight VanBlon, Raleigh, NC (US); Joshua N. Novak, Wake Forest, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 84 days.

(21) Appl. No.: 16/792,207

(22) Filed: Feb. 15, 2020

(65) Prior Publication Data

US 2021/0258220 A1    Aug. 19, 2021

(51) Int. Cl.

| | | |
|---|---|---|
| *H03G 3/20* | (2006.01) | |
| *H04R 3/00* | (2006.01) | |
| *H04L 41/08* | (2022.01) | |
| *G06F 3/16* | (2006.01) | |
| *G10L 15/22* | (2006.01) | |
| *H04R 1/08* | (2006.01) | |
| *H04L 41/0806* | (2022.01) | |
| *H04R 1/10* | (2006.01) | |
| *G16Y 30/00* | (2020.01) | |

(52) U.S. Cl.
CPC .......... *H04L 41/0889* (2013.01); *G06F 3/167* (2013.01); *G10L 15/22* (2013.01); *H04L 41/0806* (2013.01); *H04R 1/08* (2013.01); *H04R 1/1008* (2013.01); *H04R 3/00* (2013.01); *G10L 2015/223* (2013.01); *G16Y 30/00* (2020.01); *H04R 2420/05* (2013.01)

(58) Field of Classification Search
CPC .............. H04R 1/1041; H04R 2420/09; H04R 2420/05; H04R 29/004; H01R 13/703; H04M 1/6058
USPC .................................................. 381/110, 122
See application file for complete search history.

(56) References Cited

U.S. PATENT DOCUMENTS

| | | | |
|---|---|---|---|
| 8,898,064 B1* | 11/2014 | Thomas .................. | G06F 21/32 704/275 |
| 2011/0257973 A1* | 10/2011 | Chutorash .......... | G01C 21/3661 701/1 |
| 2019/0149933 A1* | 5/2019 | Chun .................... | H04R 1/1041 381/58 |
| 2019/0354731 A1* | 11/2019 | Lai ........................ | G06F 21/316 |
| 2020/0152186 A1* | 5/2020 | Koh ........................ | G10L 15/08 |

\* cited by examiner

*Primary Examiner* — George C Monikang
(74) *Attorney, Agent, or Firm* — John M. Rogitz; John L. Rogitz

(57) ABSTRACT

In one aspect, a device includes at least one processor, a touch-enabled display accessible to the at least one processor, and storage accessible to the at least one processor. The storage includes instructions executable by the at least one processor to detect a hover of a body part of a user or other physical object above the touch-enabled display, where the hover does not include the physical object physically touching the touch-enabled display. The instructions are also executable to identify a graphical object underneath the hover and to cache data associated with the graphical object prior to the graphical object being selected based on the physical object physically touching the touch-enabled display.

20 Claims, 4 Drawing Sheets

CONFIGURATION OF DEVICE THROUGH MICROPHONE PORT

FIELD

The present application relates to technically inventive, non-routine solutions that are necessarily rooted in computer technology and that produce concrete technical improvements.

BACKGROUND

As recognized herein, when a user wishes to install a new device such as an Internet of things (IoT) device into a home network, often times the user must navigate a series of burdensome screens presented on a very small and difficult-to-read electronic display, and also enter complex information using a limited number of keys. This can be very cumbersome and time consuming.

Furthermore, even in cases where a companion application may be downloaded to the user's smart phone over the Internet for the smart phone to then communicate with the new device for the new device to join the network, the correct application must first be located, downloaded, installed, its features and user interfaces learned and navigated, etc. All of that can also be confusing and time consuming, not to mention that consent often must be given for undesirable data harvesting from the user's phone by the application.

There are currently no adequate solutions to the foregoing computer-related, technological problems that specifically arises in the realm of computer networks.

SUMMARY

Accordingly, in one aspect a first device includes at least one processor, a microphone port accessible to the at least one processor, and storage accessible to the at least one processor. The storage includes instructions executable by the at least one processor to determine that the microphone port has been engaged with a plug and to initiate a process for configuring the first device based on the determination.

Configuring the first device may include joining an Internet of things network, a local area network, and/or a Wi-Fi network. Additionally, or alternatively, configuring the first device may include enabling one or more settings associated with the first device.

Furthermore, in some implementations the instructions may be executable to execute, at the first device, a digital assistant as part of the process. Thus, for instance, the instructions may be executable to execute the digital assistant to provide one or more audible prompts via a speaker in communication with the at least one processor, and to execute the digital assistant to identify one or more responses to the one or more audible prompts as spoken by an end-user into a microphone accessible to the at least one processor. The speaker and microphone may be disposed on a headset engaged with the first device via the microphone port. Also, in some examples the first device may include the headset and/or the first device may not include an electronic display.

In another aspect, a method includes determining that a port on a first device has been engaged with a plug and, responsive to the determining, executing software stored at the first device to configure the first device based on audible input from a user.

The first device may be configured with a device name indicated via the audible input. The first device may also be configured at least in part by enabling Wi-Fi communication. Still further, the first device may be configured to connect to a network with a network name indicated via the audible input and with a password indicated via the audible input.

The port itself may be configured for wired connection to a microphone at which the audible input is receivable.

Still further, in some example implementations the software may include voice recognition software executed to process the audible input.

Additionally, in some examples the method may include executing the software to provide one or more audible requests for information through the port, and executing the software to identify one or more audible responses to the one or more requests for information, where the one or more audible responses may establish the audible input. In these implementations, the method may then include configuring one or more settings of the first device based on the one or more audible responses.

In still another aspect, at least one computer readable storage medium (CRSM) that is not a transitory signal includes instructions executable by at least one processor to determine that a port on a first device has been engaged with a plug from a second device. The instructions are also executable to, responsive to the determination, execute a setup process for the first device to configure one or more settings of the first device based on audible input from a user, with the audible input being provided via the second device.

In some implementations, the instructions may be executable to execute the setup process at least in part by communicating with the second device through the port to provide one or more audible requests for information using a speaker on the second device. The one or more audible requests may include a first audible request for a network name associated with a network to which the first device is to connect, and a second audible request for a network key associated with the network.

The details of present principles, both as to their structure and operation, can best be understood in reference to the accompanying drawings, in which like reference numerals refer to like parts, and in which:

DETAILED DESCRIPTION

Figure 1:
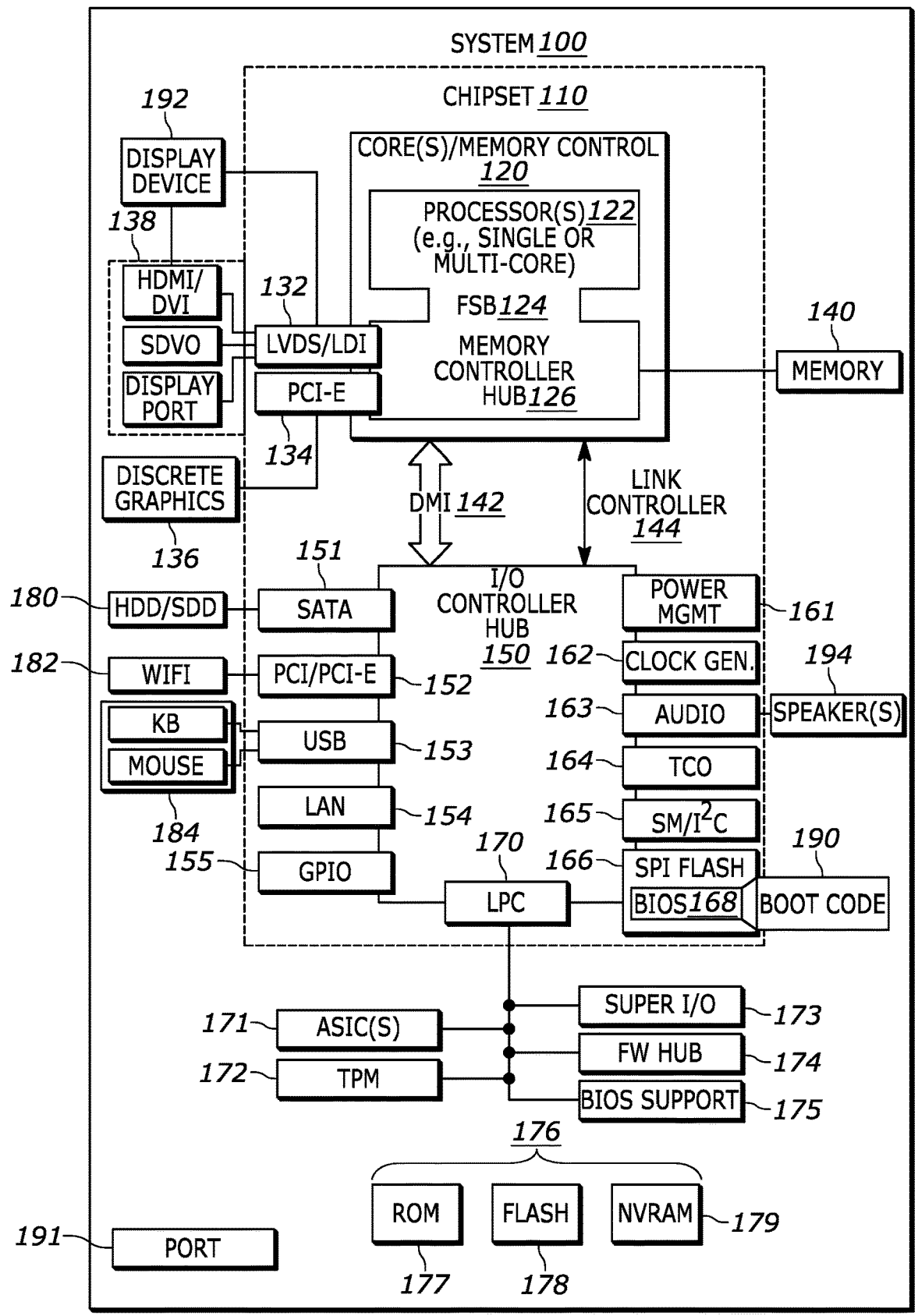
FIG. 1 is a block diagram of an example system consistent with present principles.

Among other things, the present application allows for seamless and relatively easy configuration of a device via the headphone/mic plug into any IoT device so that an audible setup menu may be enabled or auto-launched, thereby improving an otherwise more complex technological setup process. Thus, when a user buys a new device, he or she can plug a headset into the new device's microphone jack and literally talk to the device to set it up. Plugging in a microphone may thus activate the device's setup features. Upon activation, the device can then walk the user through a set up voice menu. The user may then speak to a digital assistant executing at the new device via the physically connected mike/speakers on the headset or elsewhere. Screenless/displayless devices in particular may be configured in such a way without already being connected to a network to access configuration/settings information.

Thus, the new device to be configured may be provided by a developer with basic pre-programmed voice recognition capabilities (and/or a voice digital signal processor chip) to allow for efficient voice recognition of responses to a base set of questions, including recognition of yes/no answers, numbers, letters, and other items that might be spoken or spelled out.

For example, if the device to be configured were a printer, the user may plug in a headset to the printer's microphone/headset jack, and then configure the device audibly without having to use a tiny printer screen and a bunch of visual menus. Instead, the user's voice and a standardized set of voice prompts may be utilized.

Example audible prompts and answers that might be transmitted via the microphone jack include "Would you like to enable Wi-Fi on this device?" [user says yes or no], "Tell me (or spell) the name of the Wi-Fi network" [user speaks answer], "What is your wireless key?" [user speaks the key one character at a time, in sequence], and "What would you like to name this device?" [user speaks/spells a name].

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., an Internet of things (IoT) device, a game console such as XBOX®, and/or the system 100 may include a mobile communication device such as a mobile telephone, notebook computer, and/or other portable computerized device. If an IoT device, the IoT device may be or include an electronic door lock, an electronic thermostat, and electronic appliance such as an electronic stove or refrigerator, an electronic window mechanism, a webcam, etc. The system 100 may also be established by a printer, scanner, facsimile machine, a Bluetooth speaker, etc.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system may include a port, socket, and/or jack 191 for engagement with a plug that is wired to another device. For example, the port 191 may be a female microphone or headset port for receiving a male plug that is wired to a headset having an earpiece speaker and microphone. Input to the headset may then be transmitted to the system 100 via the port connected to the headset.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
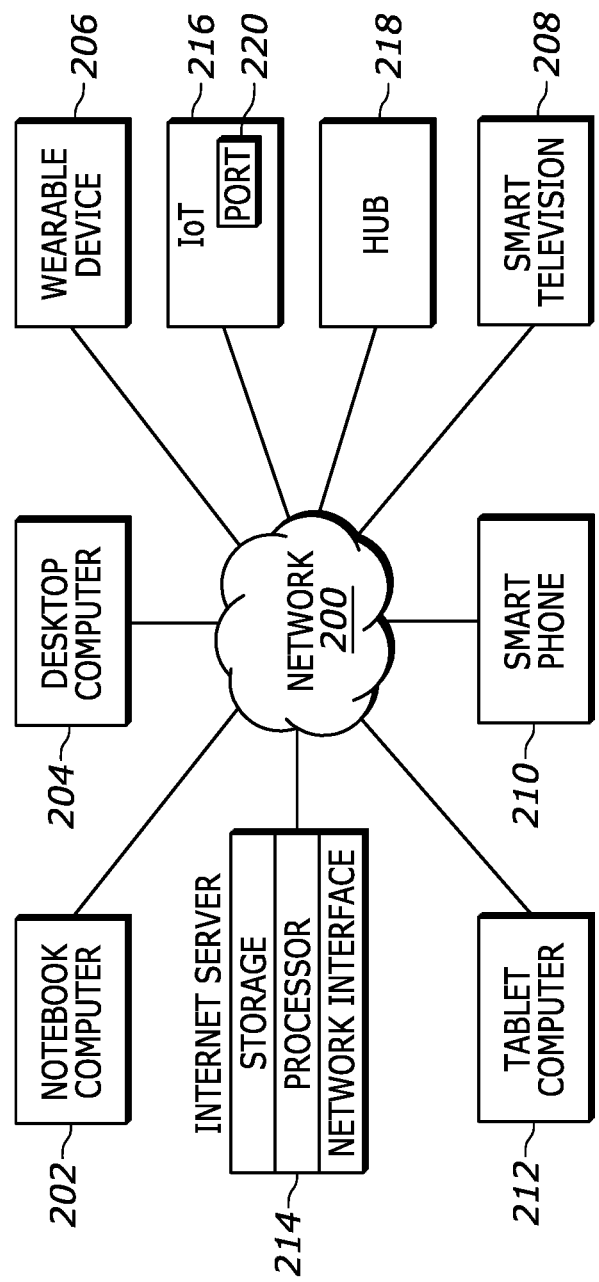
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, an IoT device 216, a network hub 218, and a server 214 such as an Internet server that may provide cloud storage accessible to the devices 202-212, 216, 218. It is to be understood that the devices 202-218 are configured to communicate with each other over the network 200 to undertake present principles.

Describing the IoT device 216 in more detail, it may be any of the IoT devices disclosed herein such as an electronic door lock, webcam, etc. The device 216 may also be a printer, scanner, facsimile machine, refrigerator, etc., among other things. As also shown, the IoT device 216 may include a port/socket/jack 220 for receiving a plug from a headset or microphone consistent with present principles.

In terms of the hub 218, it may be a tablet computer or other device mounted on a wall within a residence, may be a smart phone, may be a laptop computer, and/or may itself be an IoT device. In any case, it is to be understood that other IoT devices communicating over the same network (e.g., an IoT network, local area network, and/or Wi-Fi network) may be controlled, turned on/off, have settings changed, etc. via the hub 218.

Figure 3:
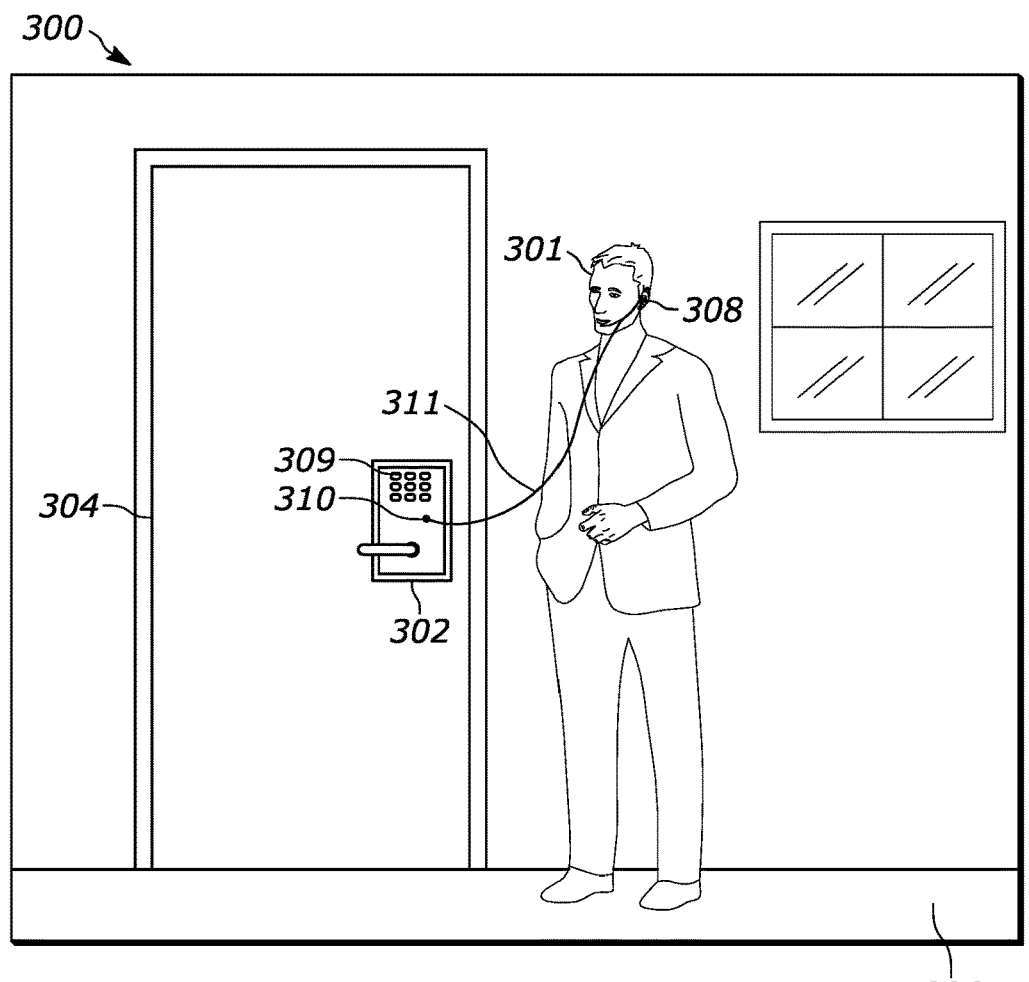
FIG. 3 is an example illustration consistent with present principles.
Figure 4:
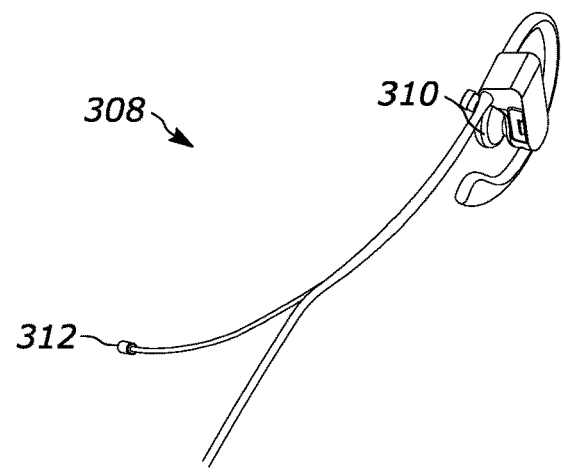
FIG. 4 is a block diagram of an example headset consistent with present principles.

Now referring to FIG. 3, it shows an example illustration 300 consistent with present principles. As shown, an end-user 301 is seeking to configure an electronic door handle and lock combination 302 for a door 304 of a personal residence 306 after the handle/lock device 302 was physically installed on the door 304. To do so, the user may don a headset 308, as also shown in FIG. 4. The headset 308 may include a speaker 310 for placement adjacent to an ear of the end-user 301 for the user to hear audio presented via the headset 308. The headset 308 may also include a microphone 312 for placement adjacent to the mouth of the end-user 301 for the user to provide audible input to the headset 308 which may ultimately be communicated to the electronic handle/lock device 302 as will be described further below.

However, first note that the headset 308 may be another type other than the one shown. For example, it may be an augmented or virtual reality headset, electronic eyeglasses, etc. Also note that the headset 308 may include still other components that are now shown, such as a network transceiver for network communication, a processor, storage, RAM, a battery for powering the headset 308, etc.

As also shown in FIG. 3, the handle/lock device 302 may include a keypad 309 as well as a port 310 at which a plug of a wire 311 that is wired to the headset 308 may be engaged. Data may be transmitted back and forth between the handle/lock device 302 and headset 308 via the port 310 and wire 311. The port 310 itself may be a microphone port, or a headset port specifically for communication not just of data indicative of audible input to the microphone 312 but also communication of data indicative of audible output from the handle/lock device 302 to the headset 308 for presentation via the speaker 310. Thus, both the port 310 and plug of the wire 311 may have respective reciprocal tips, rings, or sleeves for a microphone channel over which microphone data may be transmitted, a left audio channel over which left audio output data may be transmitted, and/or a right audio channel over which right audio output data may also be transmitted.

Thus, setup software stored locally in storage in the handle/lock device 302 may be executed by a processor within the handle/lock device 302 in order to initiate a setup process for the handle/lock device 302 consistent with present principles. The setup process may include the software transmitting audible prompts through the port 310 and over the wire 311 to the headset 308 so that the audible prompts themselves may be presented to the user 301 via the speaker 310 on the headset 308. The user 301 may then provide respective audible responses to the respective prompts through the microphone 312 that may be transmitted back to the handle/lock device 302 over the wire 311 and through the port 310. The prompts and responses may be provided in sequence, e.g., a first prompt may be provided, and a first response may be given in response, and then a second prompt may be provided, and a second response may be given in response.

The prompts may request information and/or preferences for various device settings, such as hours of operation, type of operation, whether and how to execute various device functions, etc. For example, in this case the preferences may include a user-defined four-digit unlock code that may be entered to the keypad 309 in order to unlock the door 304 via the handle/lock device 302. If the device being set up/configured were a refrigerator rather than a door/lock, the preferences might include a temperature at which the inside box of the refrigerator is to be maintained. As another example, if the device being set up/configured were a coffee maker, the preferences might include coffee temperature and amount of coffee to automatically dispense. As but one more example, if the device being set up/configured were a thermostat, the preferences may include a preferred room temperature at which the thermostat should be set.

The prompts may also request information such as a device name that the user 301 wishes to assign to the handle/lock device 302 so that the device name may be stored at the device and represented to other devices communicating over the same network when the user views network-connected devices through the other devices. Still further, the prompts may request information such as a network name for an existing IoT network, local area network, and/or Wi-Fi network over which the handle/lock device 302 is to communicate, as well as a password or network key to logon/authenticate to and access the network for communication with other devices over the network.

Figure 5:
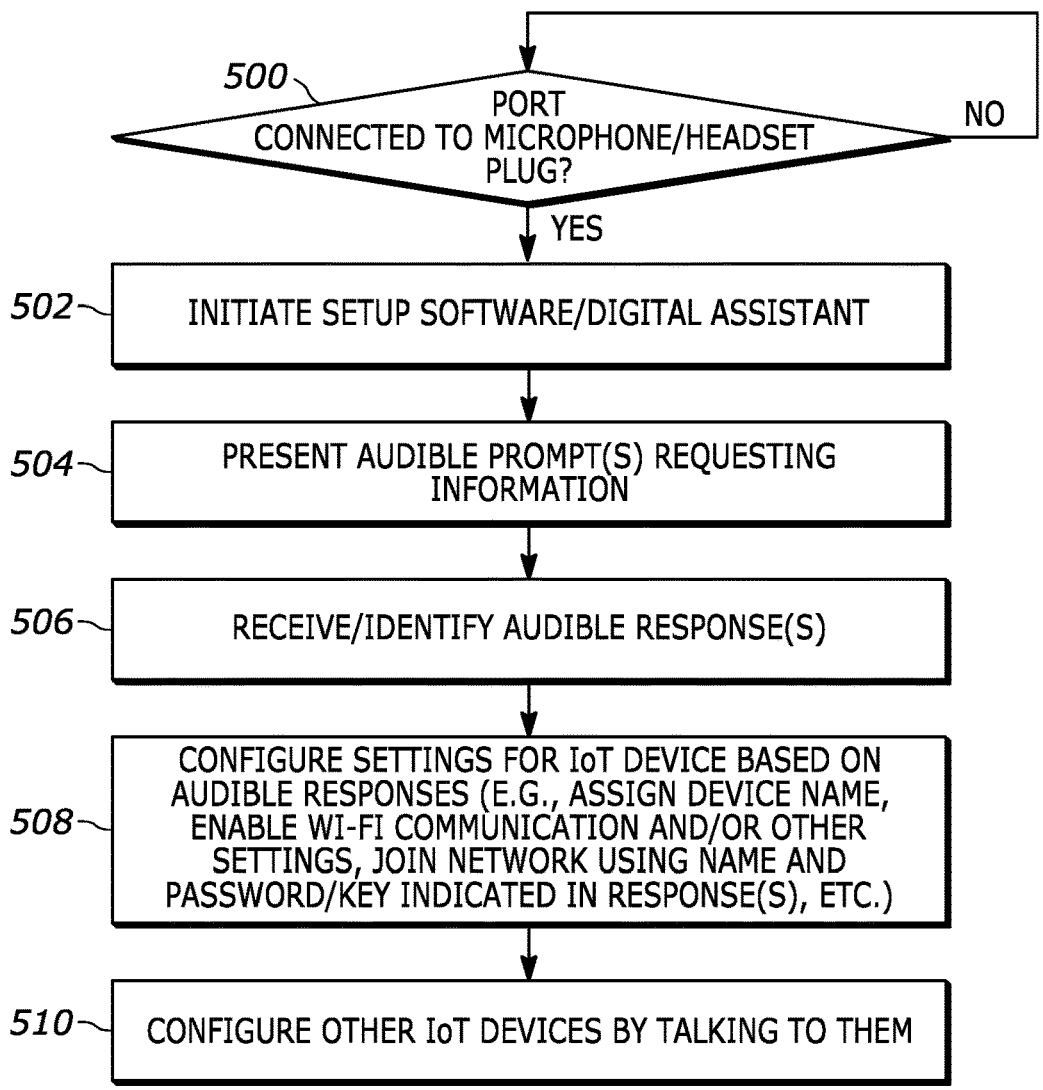
FIG. 5 is a flow chart of an example algorithm consistent with present principles.

Now describing FIG. 5, it shows example logic that may be executed by a device consistent with present principles, such as an IoT device or other type of device that is being set up. Note that while the logic of FIG. 5 is shown in flow chart format, state logic or other suitable logic may also be used.

Beginning at decision diamond 500, the device may determine whether its microphone port or headset port has been connected to a plug of another device. To make the determination at diamond 500, if a change in electrical current or resistance is sensed within the port, this may indicate that a plug has been engaged with the port and thus result in an affirmative determination. Conversely, no change in current or resistance may be indicative of no plug being engaged and hence result in a negative determination.

As shown in FIG. 5, a negative determination at diamond 500 may result in the device continuing to make the determination at diamond 500 until an affirmative determination is made. Then once an affirmative determination is made the logic may proceed to block 502.

At block 502 the device may initiate, launch, or execute setup software for configuring the device consistent with present principles. The setup software may include a digital assistant or voice recognition software that may be used for audio communication between an end-user and the device consistent with present principles. Note that the digital assistant or voice recognition software may therefore be configured with speech to text, and text to speech, software code in order to converse audibly with the user locally at the device without the aid of an Internet connection to encode audio to be presented to the user and to decode speech received from the user via a remotely-located server. Accordingly, digital assistants such as Amazon's Alexa, Apple's Siri, Microsoft's Cortana, and Google's Assistant may be used.

From block 502 the logic may then proceed to block 504. At block 504 the device may execute the software/digital assistant to present one or more audible prompts to the user at the user's headset through the port of the device consistent with present principles. The prompts or requests for user preferences themselves may be preestablished by a manufacturer or developer of the device and stored locally at the device. After block 504, the logic may next proceed to block 506.

At block 506 the device may receive/identify audible responses to the prompts through the microphone of the headset and port of the device and process them using the software/digital assistant. The logic may then move to block 508 where the device may, based on the processing, configure one or more settings of the device based on the audible responses. Again, configuring settings may include assigning a device name to the device, enabling Wi-Fi communication (as opposed to disabling the device's Wi-Fi transceiver) and enabling other settings, joining a particular Wi-Fi or other network using a network name and password/key specified in the audible response(s), etc.

From block 508 in some examples the logic may then proceed to block 510. At block 510 the device may be used to configure still other IoT devices or other new devices joining the same network. For example, a wired connection may be established between the devices using their respective microphone/audio ports, and then the devices may either exchange settings data itself or use their own respective digital assistants in an audio exchange of information as if either or both were people orally conversing. Thus, an audible prompt may be provided by one device that is being set up and then recognized at another device that has already been set up, and then the other device that is already set up may use its own digital assistant to process the prompt and provide an appropriate audible response that is transmitted back to first device. In some examples, since this process may involve more robust artificial intelligence-based voice interaction than might practically be implemented in a software module stored locally at either device, the already-set up device's Internet connection may be used to identify appropriate responses to the prompts using a remotely-located server.

Figure 6:
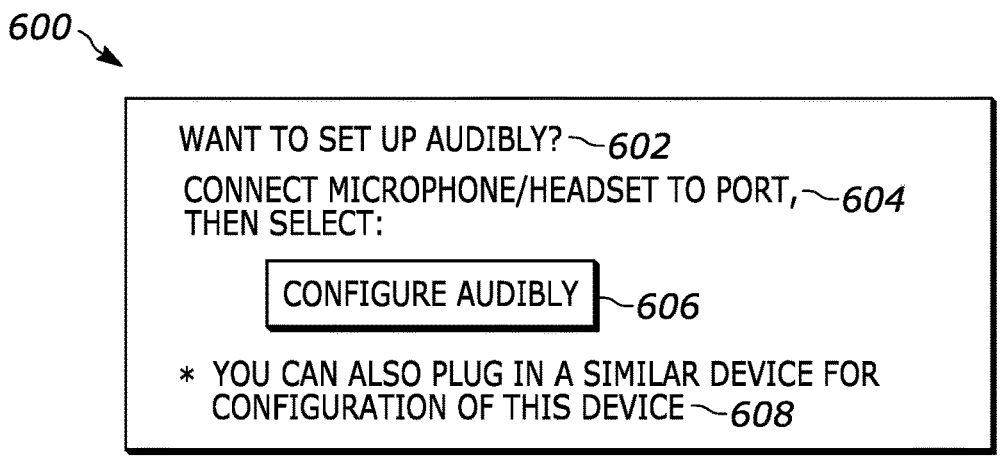
FIG. 6 is an example graphical user interface (GUI) that may be presented on the display of a device to be configured consistent with present principles.

Now describing FIG. 6, it shows an example graphical user interface (GUI) 600 that may be presented on the electronic display of an IoT device or other device that is to be set up consistent with present principles, assuming the IoT device has its own display. As shown, the GUI 600 may include text 602 asking whether a user would like to set up the device audibly, as well as instructions 604 on how to do so. Specifically, the instructions 604 may indicate that a microphone or headset should be wiredly connected through the device's port and then the selector 606 may be selected (e.g., using touch input) to initiate the setup process. However, note that in other embodiments the selector 606 may not be presented as part of the GUI 600 where setup may be initiated automatically responsive to engagement of a microphone/headset plug with the device's port. Regardless, note that as also shown, the GUI 600 may include additional text instructions 608 that setup may also be performed by connecting another device through wired connection using the new device's port as set forth above in reference to block 510 of FIG. 5.

In examples where a new device being set up may not have an electronic display but may still have a speaker, note that the text 602, 604, and/or 608 may be read aloud by the device as presented over the speaker to similarly instruct the user. Also note that in some examples this speaker may also be used to present the audible prompts themselves rather than transmitting them through the device's port for presentation at a headset, and in such cases a stand-alone microphone (or even the headset) may still be connected through the port for providing audible responses back to the device being set up.

Also consistent with present principles, note that short-range wireless communication may be used in some examples rather than a wired connection via a port. For example, near field communication (NFC), radio frequency (RF) communication, infrared (IR) communication, or Bluetooth communication may be used for transmitting data indicating audible prompts and audible responses between devices, e.g., after the user presses depressible pairing buttons on both the device being set up and headset to complete pairing of the devices.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A door lock, comprising:
   at least one processor;
   a port accessible to the at least one processor; and
   storage accessible to the at least one processor and comprising instructions executable by the at least one processor to:
   determine that the port has been engaged with a plug;
   based on the determination, initiate a process for configuring the door lock through one or more audible prompts;
   as part of the process, present a first audible prompt requesting an unlock code for the door lock;
   subsequent to the first audible prompt, identify audible input indicating the unlock code; and
   based on audible input, configure the door lock to unlock with the unlock code.

2. The door lock of claim 1, wherein the instructions are executable to:
   execute, at the door lock, a digital assistant as part of the process to provide the first audible prompt via a speaker in communication with the at least one processor; and
   execute the digital assistant to identify the audible input as spoken by an end-user into a microphone accessible to the at least one processor.

3. The door lock of claim 2, wherein the speaker and microphone are disposed on a headset engaged with the door lock via the port.

4. The door lock of claim 1, wherein the audible input is first audible input, and wherein the instructions are executable to:
   present a second audible prompt different from the first audible prompt, the second audible prompt requesting hours of operation for the door lock;
   subsequent to the second audible prompt, identify second audible input different from the first audible input, the second audible input indicating the hours of operation; and
   based on the second audible input, configure the door lock with the hours of operation.

5. The door lock of claim 1, wherein the audible input is first audible input, and wherein the instructions are executable to:
   present a second audible prompt different from the first audible prompt, the second audible prompt requesting a name for the door lock;
   subsequent to the second audible prompt, identify second audible input different from the first audible input, the second audible input indicating the name for the door lock; and
   based on the second audible input, configure the door lock with the name for the door lock.

6. The door lock of claim 1, wherein the door lock is a first door lock, and wherein the instructions are executable to:
   audibly exchange settings data with a second door lock different from the first door lock.

7. The first door lock of claim 6, wherein the settings data comprises the unlock code.

8. The first door lock of claim 6, wherein the instructions are executable to:
   as part of the audible exchange, identify a second audible prompt from the second door lock, the second audible prompt requesting the settings data; and
   responsive to the second audible prompt, audibly provide the settings data to the second door lock.

9. The door lock of claim 1, wherein the instructions are executable to:
   present a graphical user interface (GUI) on a display, the GUI asking whether a user would like to set up the door lock audibly, the GUI also comprising instructions on how to set up the door lock audibly.

10. The door lock of claim 9, wherein the instructions on how to set up the door lock audibly comprise an instruction to connect another device to the door lock via the port.

11. A method, comprising:
    determining that a port on a door lock has been engaged with a plug;
    responsive to the determining, executing software stored at the door lock to configure the door lock;
    as part of executing the software, presenting an audible prompt requesting an unlock code for the door lock;
    subsequent to the audible prompt, identifying audible input indicating the unlock code; and
    based on audible input, configuring the door lock to unlock with the unlock code.

12. The method of claim 11, wherein the port is configured for wired connection to a microphone at which the audible input is receivable.

13. The method of claim 11, wherein the software comprises voice recognition software executed to process the audible input.

14. The method of claim 11, wherein the audible prompt is a first audible prompt, wherein the audible input is first audible input, and wherein the method comprises:
    presenting a second audible prompt different from the first audible prompt, the second audible prompt requesting hours of operation for the door lock;
    subsequent to the second audible prompt, identifying second audible input different from the first audible input, the second audible input indicating the hours of operation; and
    based on the second audible input, configuring the door lock with the hours of operation.

15. The method of claim 11, wherein the door lock is a first door lock, and wherein the method comprises:
    using the first door lock to audibly exchange settings data with a second door lock different from the first door lock.

16. The method of claim 11, wherein the method comprises:
    presenting a graphical user interface (GUI) on a display, the GUI comprising instructions on how to set up the door lock audibly.

17. At least one computer readable storage medium (CRSM) that is not a transitory signal, the computer readable storage medium comprising instructions executable by at least one processor to:
    determine that a port on a first device has been engaged with a plug from a second device; and
    responsive to the determination, execute a process to configure one or more settings of the first device;

as part of the process, present an audible prompt requesting an unlock code;
subsequent to the audible prompt, identify audible input indicating the unlock code; and
based on audible input, configure the first device with the unlock code.

18. The CRSM of claim 17, wherein the audible prompt is a first audible prompt, wherein the audible input is first audible input, and wherein the instructions are executable to:
present a second audible prompt different from the first audible prompt, the second audible prompt requesting hours of operation for the first device;
subsequent to the second audible prompt, identify second audible input different from the first audible input, the second audible input indicating the hours of operation; and
based on the second audible input, configure the first device with the hours of operation.

19. The CRSM of claim 17, wherein the instructions are executable to:
audibly exchange settings data with a third device different from the first and second devices.

20. The CRSM of claim 17, wherein the instructions are executable to:
present a graphical user interface (GUI) on a display, the GUI comprising instructions on how to set up the first device audibly.

* * * * *